United States Patent
Morabit

(10) Patent No.: US 11,464,162 B2
(45) Date of Patent: Oct. 11, 2022

(54) REVERSIBLE LINE BLADES

(71) Applicant: Aero-Flex Technologies, Inc., Rock Hill, SC (US)

(72) Inventor: Vincent D. Morabit, Rock Hill, SC (US)

(73) Assignee: Aero-Flex Technologies, Inc., Rock Hill, SC (US)

( * ) Notice: Subject to any disclaimer, the term of this patent is extended or adjusted under 35 U.S.C. 154(b) by 117 days.

(21) Appl. No.: 16/830,746

(22) Filed: Mar. 26, 2020

(65) Prior Publication Data
US 2020/0305343 A1 Oct. 1, 2020

Related U.S. Application Data

(60) Provisional application No. 62/825,237, filed on Mar. 28, 2019.

(51) Int. Cl.
*A01D 34/416* (2006.01)

(52) U.S. Cl.
CPC ..... *A01D 34/4168* (2013.01); *A01D 34/4166* (2013.01)

(58) Field of Classification Search
CPC ............ A01D 34/4168; A01D 34/4166; A01D 34/416
See application file for complete search history.

(56) References Cited

U.S. PATENT DOCUMENTS

| | | | | |
|---|---|---|---|---|
| 4,126,991 A * | 11/1978 | Gobin | ................ | A01D 34/4168 56/12.7 |
| 4,165,597 A * | 8/1979 | Scanland | ........... | A01D 34/4168 56/295 |
| 5,761,816 A * | 6/1998 | Morabit | ............. | A01D 34/4168 30/276 |
| RE36,940 E * | 11/2000 | Fogle | ................. | A01D 34/4168 30/276 |
| 7,210,231 B2 * | 5/2007 | Legrand | ............. | A01D 34/4168 30/276 |
| 9,414,540 B2 * | 8/2016 | Morabit | ............... | A01D 34/902 |
| 9,474,205 B2 * | 10/2016 | Morabit | ............... | A01D 34/416 |
| 10,631,458 B2 * | 4/2020 | Morabit | ............. | A01D 34/4168 |
| 2001/0003935 A1 * | 6/2001 | Morabit | ............. | A01D 34/4166 83/13 |
| 2005/0188544 A1 * | 9/2005 | Legrand | ............. | A01D 34/4168 30/276 |
| 2010/0101099 A1 * | 4/2010 | Morabit | ............. | A01D 34/4166 30/347 |
| 2012/0102762 A1 * | 5/2012 | Cigarini | ............. | A01D 34/4166 30/347 |

(Continued)

*Primary Examiner* — Omar Flores Sanchez
(74) *Attorney, Agent, or Firm* — Nixon & Vanderhye P.C.

(57) ABSTRACT

A reversible line blade for a rotating trimmer includes a loading section configured to be securable for rotation with a head of the rotating trimmer, a living hinge extending from the loading section, and a transition section extending from the living hinge and having a first cross-sectional shape with matching leading edge and trailing edge geometries. A cutting segment extends from the transition section and has a second cross-sectional shape that is different from the first cross-sectional shape. With matching lead edge and trailing edge geometries, the same line blade is functional for both clockwise trimmers and counter-clockwise trimmers.

18 Claims, 10 Drawing Sheets

(56) References Cited

U.S. PATENT DOCUMENTS

| | | | |
|---|---|---|---|
| 2012/0208021 A1* | 8/2012 | Yang | A01D 34/4168 428/400 |
| 2016/0044864 A1* | 2/2016 | Hermann | A01D 34/4168 30/276 |
| 2016/0143220 A1* | 5/2016 | Child | A01D 34/4166 30/276 |
| 2018/0184588 A1 | 7/2018 | Morabit | |
| 2020/0120864 A1* | 4/2020 | Morabit | A01D 34/4168 |
| 2020/0281116 A1* | 9/2020 | Guo | A01D 34/4168 |
| 2020/0305343 A1* | 10/2020 | Morabit | A01D 34/4166 |
| 2020/0375100 A1* | 12/2020 | Skinner | A01D 34/4168 |
| 2021/0092898 A1* | 4/2021 | Ishikawa | B29C 43/226 |

* cited by examiner

REVERSIBLE LINE BLADES

CROSS-REFERENCES TO RELATED APPLICATIONS

This application claims the benefit of U.S. Provisional Patent Application No. 62/825,237, filed Mar. 28, 2019, the entire content of which is herein incorporated by reference.

STATEMENT REGARDING FEDERALLY SPONSORED RESEARCH OR DEVELOPMENT (NOT APPLICABLE)

BACKGROUND

The invention relates to line blades for a rotating trimmer and, more particularly, to reversible line blades with advanced structural features that are functional for both clockwise trimmers and counter-clockwise trimmers.

Conventional gas or electric trimmers were invented in the early 1970's first using oversized extruded round fishing line. For many different reasons, the cutting heads of different trimmers rotate in different directions, about evenly split between clockwise (CW) and counter-clockwise (CCW). Currently, the market is shifting trimmers more to CCW rotation, which is generally recognized as better suited for right-handed users for better visibility and better directional pulling thrust when during edging, with the pull forces and edging path alignment more easily controlled.

Generally, most homeowner gas and electric trimmers more likely turned CW because they were driven by the more conventional clockwise rotating engines or electric motors coupled directly by cable drive to the rotating string head (without gearboxes) primarily to reduce cost. When electric trimmers were introduced, most motors turned clockwise and were mounted at the lower end of the trimmer to directly drive the string head. The professional trimmer users preferred CCW and were equipped with gear boxes that reversed the CW engine rotation of the head to CCW. In more recent years, CCW has become more popular especially benefiting right-handed users.

Since conventional monofilament cutting line is symmetrical with a generally round shape, it is not affected by rotational direction, however, it is weak in cutting and highly subject to aerodynamic drag. Additionally, due to its need for high speed for effective cutting, numerous inefficiencies and performance problems have created the need to develop hinged flexible line blades that achieve much needed solutions.

All trimmers had been initially equipped, as well as most trimmers today, with flexible monofilament (enlarged extruded fishing line) cutting line. Flexible line blades were invented by the present Applicant in the early 1990's and have been growing in acceptance because of their higher kinetic energy, reduced drag, better cutting, longer durability and unique living hinge as well as easy and simple loading, without the need for complex bump replenishing systems. While the initial design intent of the flexible line blade was to reduce air drag, their durability was the primary benefit with gas engine trimmers. Aerodynamics (drag reduction) has become a more recognized need within the last 10-15 years with the growth of power-starved battery driven trimmers.

With existing flexible line blades, a single geometry blade section extends from the vertical joint to the cutter tip with a single strut like (teardrop) geometrical shape at a constant blade pitch angle, making it purely directional depending on the intended function of the leading tip. For aerodynamic drag reduction, the blunt edge should lead, but for sharper cutting, the sharp edge should lead. For updraft, the downward tilting sharp edge would be selected as the leading edge. The additional benefit in solving the undesirable downdraft in one direction is important as downward air flow flattens grass to the ground, pushing it away from the cutters. By creating an updraft, grass is lifted-up into the blades for a much more effective cut.

The user is thus tasked to select the proper line blades and line blade orientation to achieve the desired functionality, which can be complex and difficult to fully understand.

Multi-zone line blades are described in pending U.S. patent application Ser. No. 15/858,113, the contents of which are hereby incorporated by reference, with different segments that extend beyond the vertical joint. The segments combine the aerodynamic and sharper cutting with updraft features to reduce operator selection complexities (almost all in one). However, the line blades in the pending application are directionally sensitive, requiring a selection for CW or CCW rotation. Additionally, a one inch cutting zone may have a deficiency of leaving strips of uncut grass when cutting at lower rpm speeds when the operator swings the trimmer head in an arc to cut grass while moving forward. It has been discovered that greater than a one inch sharp cutter segment zone is desirable.

While multi-zoned line blades achieve a definite energy benefit over original line blade technology, the multi-zone blades require special selection for each of the two rotations.

SUMMARY

It would thus be desirable for a single line blade that is reversible, i.e., functional for both CW trimmers and CCW trimmers while achieving desired aerodynamic functionality, cutting functionality and an updraft.

The reversible line blade according to the described embodiments provides symmetrical features on its long-dimensioned leading and trailing edges and enables the cutter to deliver superior aerodynamic and cutting efficiencies with the line blade operating in either a CW or CCW direction. The advantages can be achieved within a speed range well below current grass trimmer speeds (in particular, at speeds where monofilament cutters cannot cut due to loss of physical cutting structure). In addition to gas trimmers, the reversible line blades of the described embodiments cut very well with cordless trimmers within their lower speed ranges for energy and drag efficiencies.

The line blades also work well for gas trimmers, resulting in superior cutting performance, ability to perform at much lower speeds, with improved fuel efficiencies and reduced noise levels, among other advantages. Because of the lower speed capability, there is an improvement in engine life and durability.

Both the leading aero and cutting edges of these multi-purpose line blades are symmetrical to work in either CW or CCW directions, and when exposed to air and vegetation during rotation, deliver equal aerodynamic and cutting performance in either CW or CCW directions. The design creates a desirable updraft to improve cutting performance and also prevents a downdraft that would harmfully blow grass down and away from the cutters. The described blade eliminates complexity in selection of the multi-useful features provided by its predecessor line blades, and any prior art known at this time.

The symmetrical profiles will be beneficial for more sophisticated trimmers enabled with reversible rotational features less commonly found in the higher professional cordless trimmer price-points. Compared to conventional flexible line blades, the design also reduces 'gull wing' flapping during use.

In an exemplary embodiment, a reversible line blade for a rotating trimmer includes a loading section configured to be securable for rotation with a head of the rotating trimmer, a living hinge extending from the loading section, and a transition section extending from the living hinge and having a first cross-sectional shape with matching leading edge and trailing edge geometries. A cutting segment extends from the transition section and has a second cross-sectional shape that is different from the first cross-sectional shape.

The leading and trailing edge geometries of the first cross-sectional shape may include a blunt or curved surface for low aerodynamic drag, or a sharper edge for increased updraft with better cutting edges. The first cross-sectional shape may be essentially U-shaped, defining a central U-shaped channel along a length of the transition section. The U-shaped channel may be disposed on a lower surface of the transition section, and the transition section may also include dimples on an upper surface. The dimples may be recessed or raised. The dimples may be round, hexagonal or elliptical. The dimples may extend to or into the cutting segment.

The first cross-sectional shape (blunt or sharp) may be configured to generate an updraft regardless of a rotation direction. The leading edge and trailing edge geometries may include a 10 degree downward pitch.

The second cross-sectional shape may be elliptical. In this context, the leading edge and trailing edge geometries of the cutting segment may be sharper than the leading edge and trailing edge geometries of the transition section.

In another exemplary embodiment, a reversible line blade for a rotating trimmer includes a loading section configured to be securable for rotation with a head of the rotating trimmer, a living hinge extending from the loading section, and a transition section extending from the living hinge and having a first cross-sectional shape. The first cross-sectional shape is essentially U-shaped and configured to generate an updraft regardless of a rotation direction. A cutting segment extending from the transition section has a second cross-sectional shape that is different from the first cross-sectional shape. The second cross-sectional shape is configured and oriented for cutting vegetation. Different leading edges can be provided in the transition section for specialty purposes such as blunt for aerodynamics to reduce battery charge consumption, or sharp for stronger updraft to assist in rotary mowing.

BRIEF DESCRIPTION OF THE DRAWINGS

These and other aspects and advantages will be described in detail with reference to the accompanying drawings, in which.

DETAILED DESCRIPTION

Figure 1:
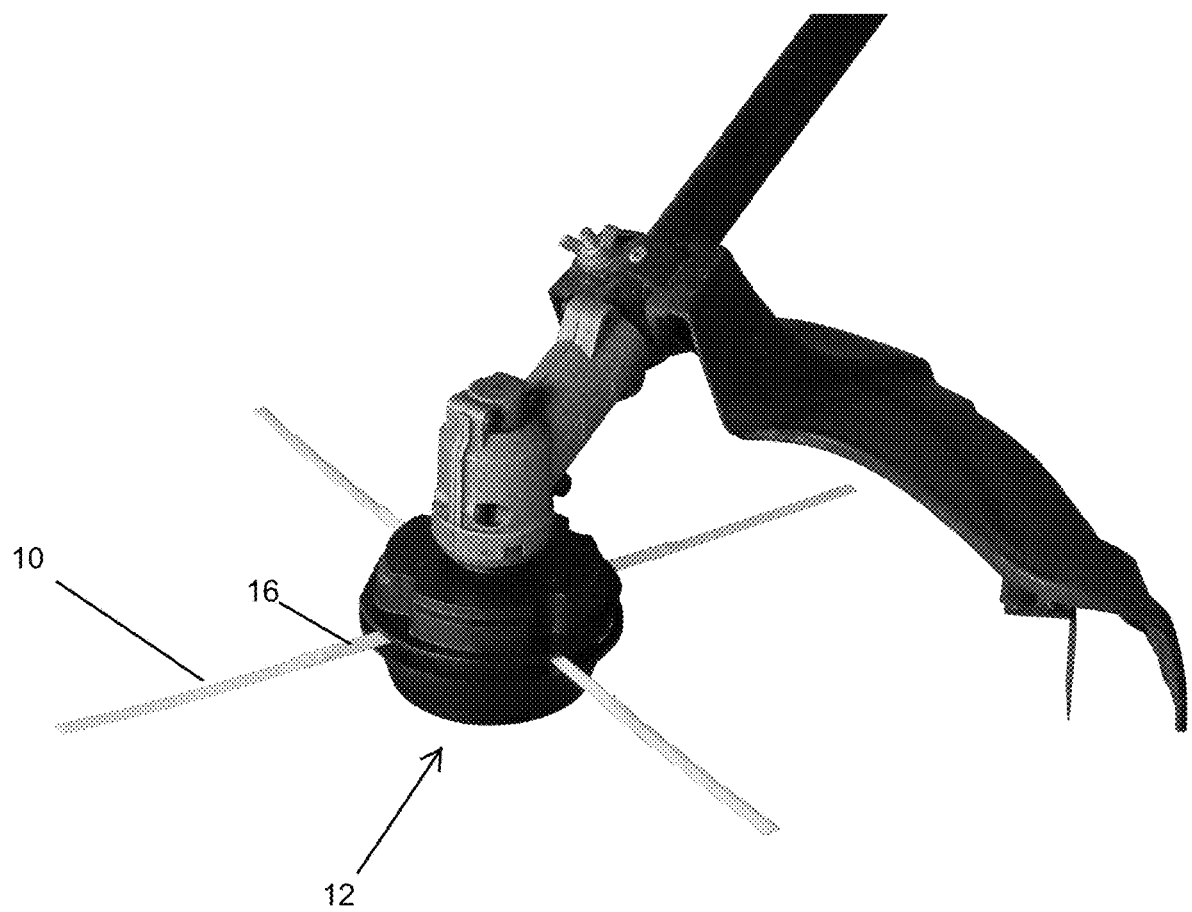
FIGS. 1 and 2 show the reversible line blades of the described embodiments supported on a rotating trimmer.
Figure 2:
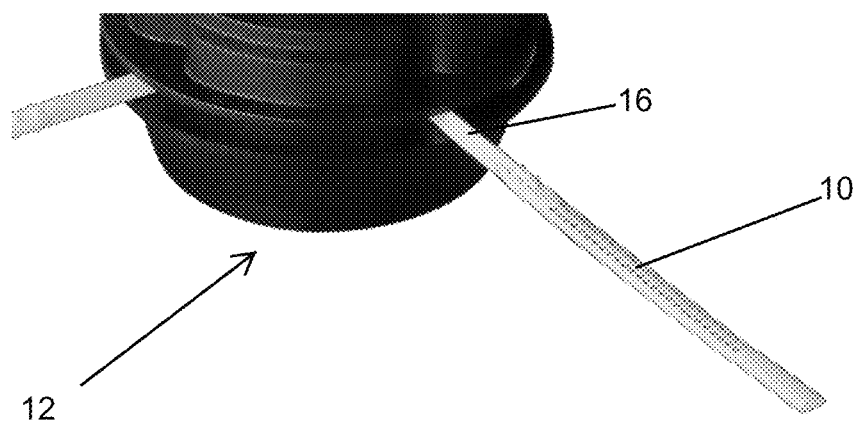

With reference to FIGS. 1 and 2, a line blade 10 is securable in a cap 12 or the like for rotation on a cutting plane with a head of a rotating trimmer. The cap 12 may form part of the head or may be attachable to an existing trimmer head.

Figure 3:
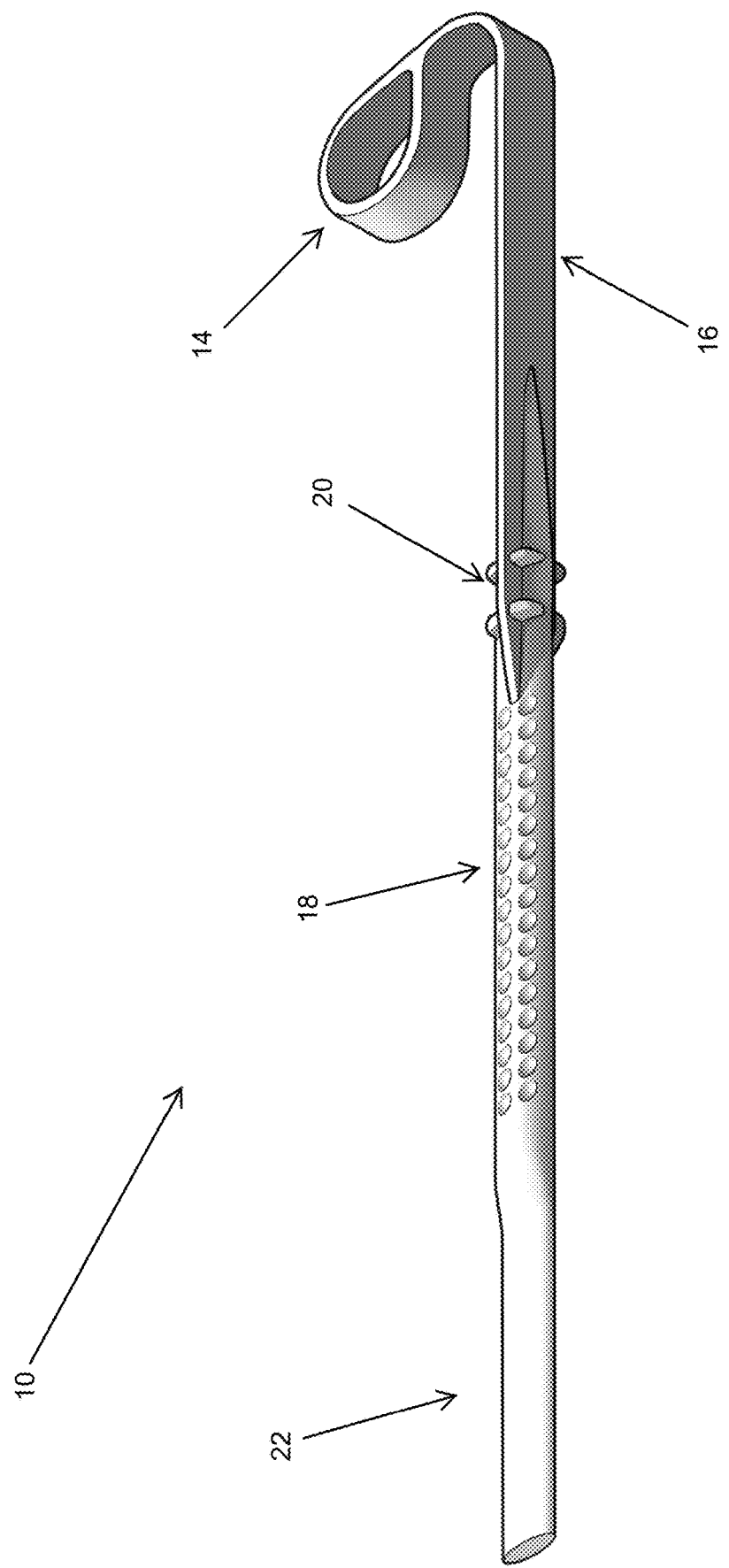
FIG. 3 is a perspective view of one side of the reversible line blade.
Figure 4:
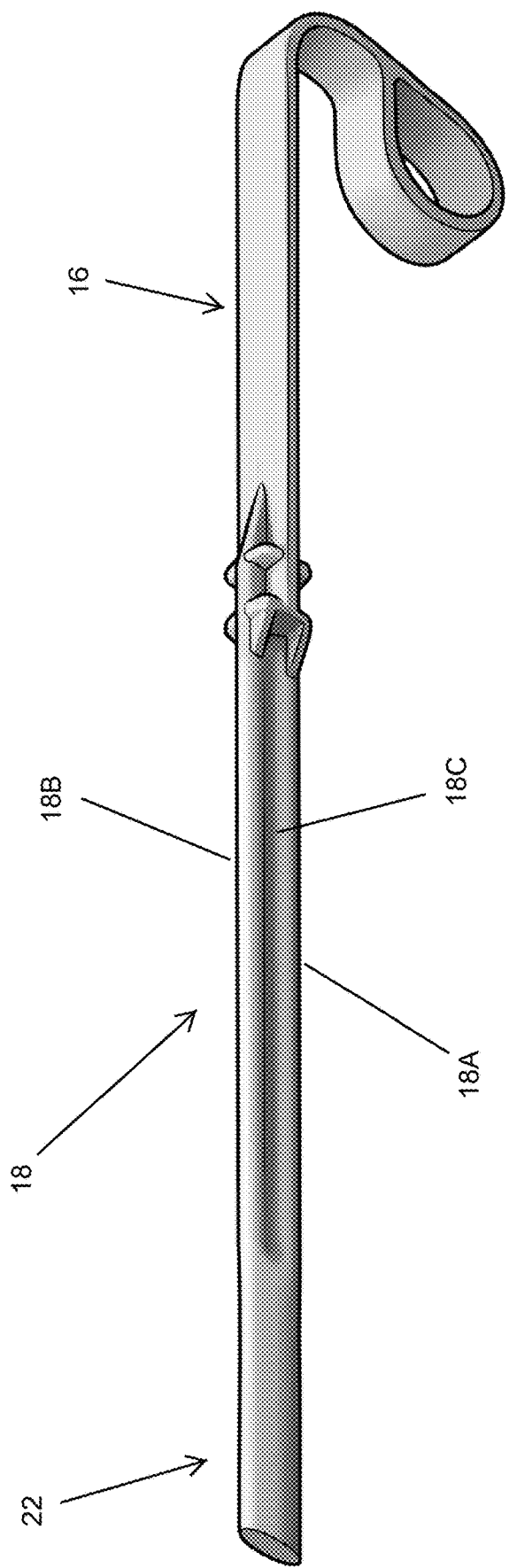
FIG. 4 is a perspective view of an opposite side of the reversible line blade.
Figure 5:
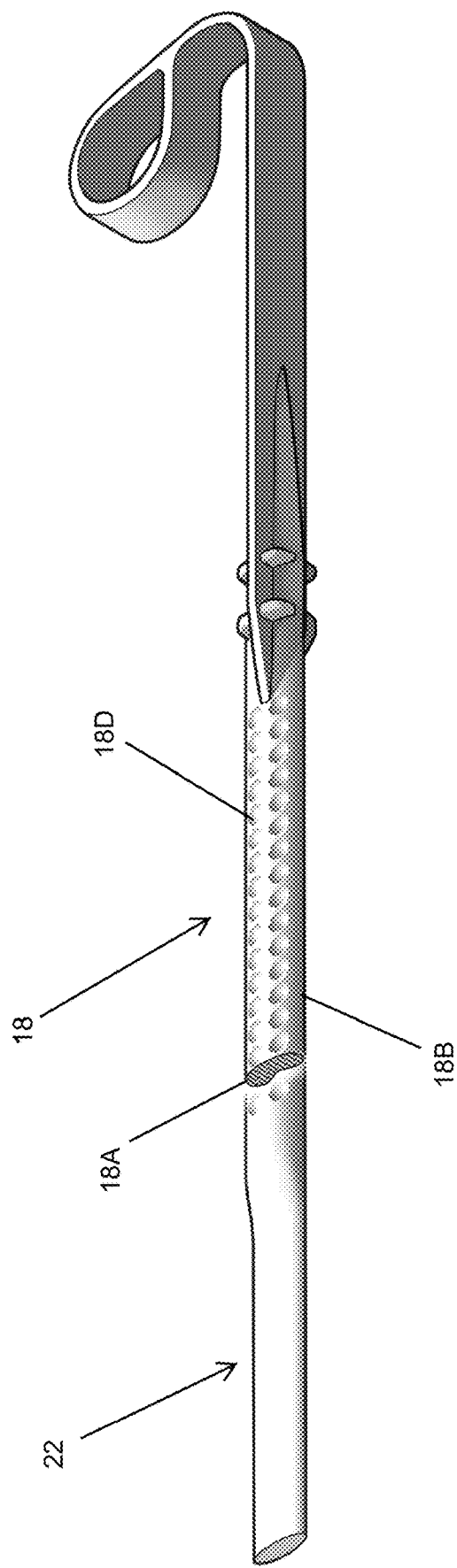
FIG. 5 shows a cross-section of the transition section and transition to the cutting segment.
Figure 6:
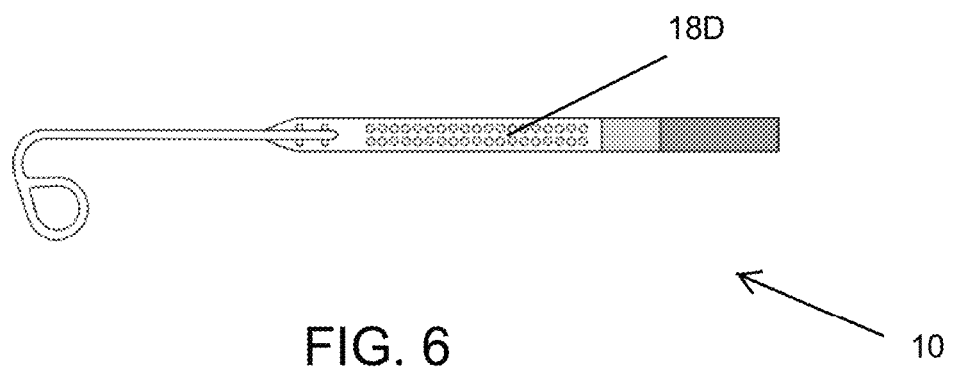
FIG. 6 is a top view of the reversible line blade.
Figure 7:
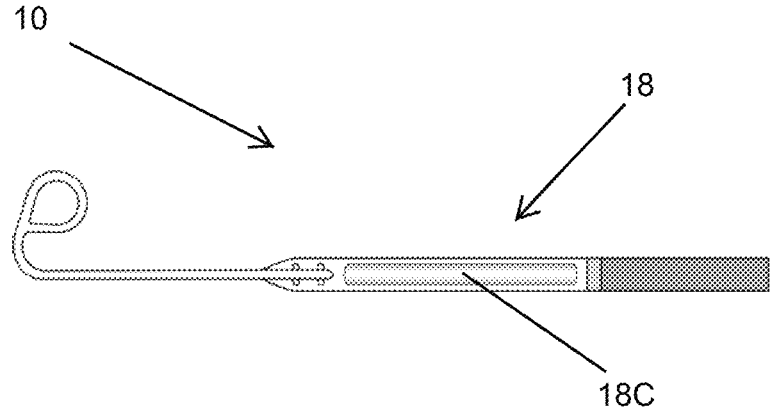
FIG. 7 is a bottom view of the reversible line blade.

FIGS. 3-5 are perspective views of the reversible line blade 10 according to the described embodiments. FIG. 6 is a top view of the line blade 10, and FIG. 7 is a bottom view of the line blade 10. The line blade 10 includes a loading section 14 that is securable to the head or cap 12 of the rotating trimmer. The loading section 14 may comprise any suitable construction for connecting the blade 10 to the cap/head 12. An exemplary structure is described in U.S. Pat. No. 9,474,205, the contents of which are hereby incorporated by reference.

The reversible line blade 10 includes a living hinge 16 extending from the loading section 14. The living hinge 16 is flexible to accommodate operating parameters of the line blade 10 and rotating head. The amount of flex in the flexible living hinge 16 is variable according to many factors, including, for example, swath diameter, hinge thickness, hinge length, material flex modulus, blade mass, tip speed, centrifugal forces, rotational inertia and more. As shown in FIGS. 1 and 2, the living hinge 16 exits the cap 12 in a generally upright orientation. That is, relative to the cutting plane (i.e., the plane defined by the rotating line blades), a height of the living hinge 16 is greater than its width or thickness. As such, the upright orientation of the living hinge 16 is detrimental to air and grass drag during use, and a length of the living hinge 16 may thus be minimized to minimize drag during use.

A transition section 18 extends from the living hinge 16. The structural and supporting ridges/ribs 20 in the area between the living hinge 16 and the transition section 18 are formed in a mold during the manufacturing process to help maintain the essentially 90° turn in orientation between the sections 16, 18.

In a preferred construction, the transition section 18 includes a first cross-sectional shape with matching leading edge 18A and trailing edge 18B geometries. With reference to FIG. 5, the leading edge 18A and the trailing edge 18B geometries have a blunt or curved surface. The leading edge 18A and trailing edge 18B geometries may alternatively have a sharper edge (see, e.g., FIGS. 8(c) and 8(d)). The first cross-sectional shape is essentially U-shaped, defining a central U-shaped channel 18C along a length of the transition section 18. See, for example, FIG. 4.

Figure 8A:
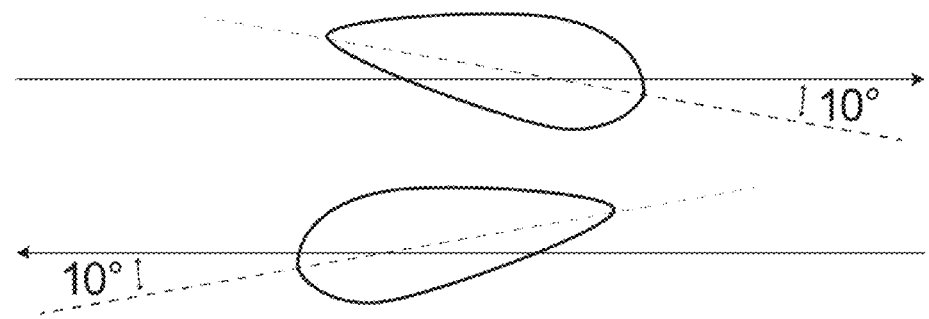
FIGS. 8(a)-8(d) show the construction of the transition section.
Figure 8B:
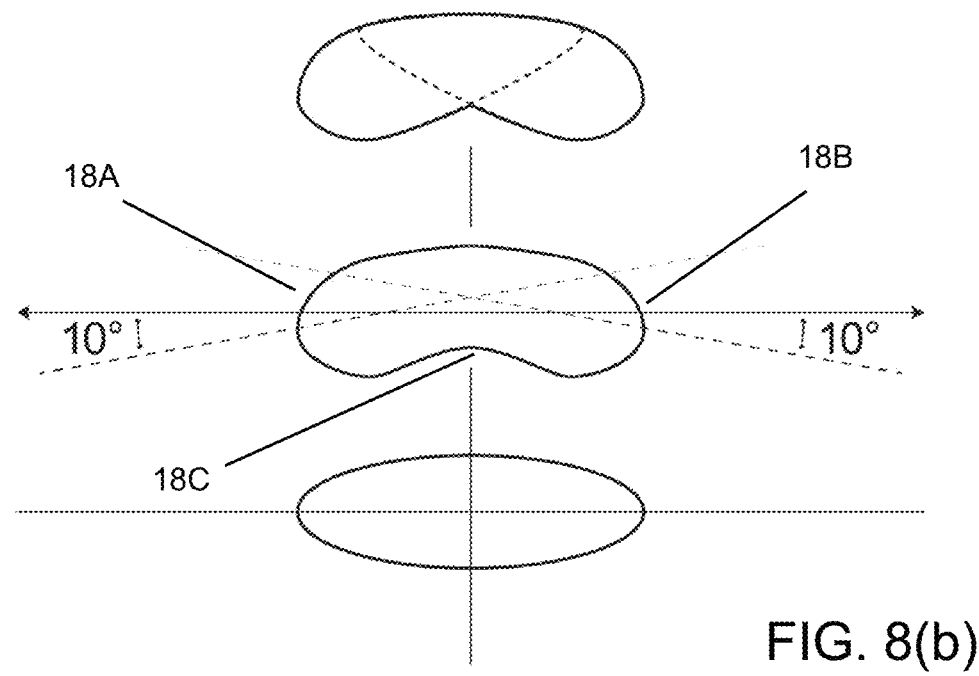
Figure 8C:
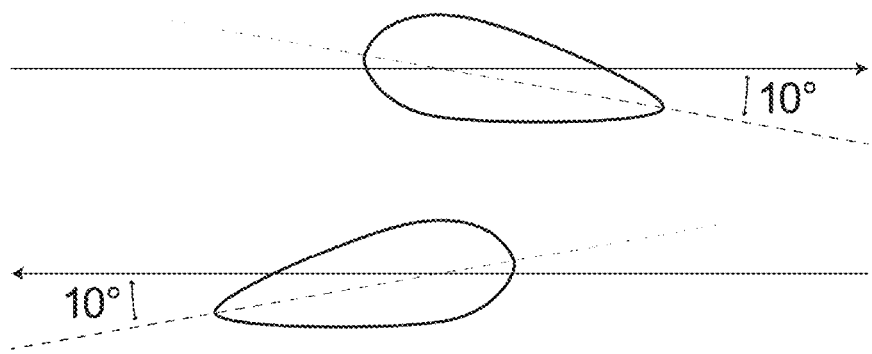
Figure 8D:
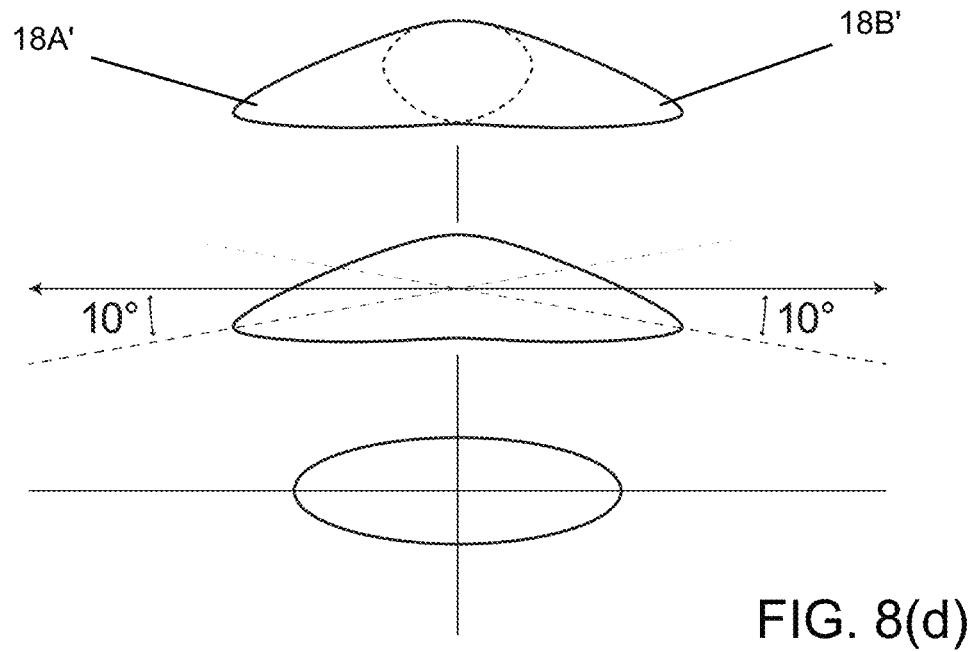
Figure 9:
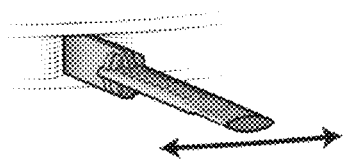
FIGS. 9-14 show variations and different views of the reversible line blades.
Figure 10:
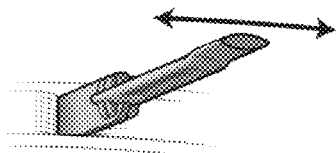
Figure 11:
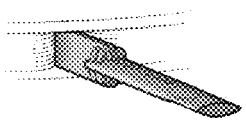
Figure 12:
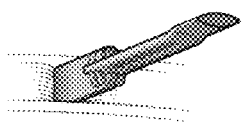

With reference to FIGS. 8(a) and 8(b), the transition section 18 is constructed by combining opposite-facing teardrop-shaped sections at a specified preferred angle. FIG. 8(a) shows exemplary teardrop sections oriented at a preferred angle of 10°. The sections are combined to define the first cross-sectional shape of the transition section 18 including the leading edge 18A, the trailing edge 18B and the U-shaped channel 18C as shown in FIG. 8(b). FIGS. 8(c) and 8(d) show corresponding structure with shaper leading and trailing edges 18A', 18B'. The preferred angle of 10° is exemplary and can vary between +/−0-25°.

In some embodiments, the U-shaped channel 18C is disposed on a lower surface of the transition section 18. FIG.

6 is a top view of the reversible line blade 10, and FIG. 7 is a bottom view of the reversible line blade 10. The U-shaped channel 18C could alternatively be provided on a top side of the line blade 10. The geometries of the transition section 18 may be continuous or segmented to present similar leading profiles for CW rotation or CCW rotation. The channel 18C increases blade stability for edging in either CW or CCW trimmer rotational directions.

In the exemplary construction with the U-shaped channel 18C disposed on a lower surface of the transition section 18, in addition to symmetry of the leading edge 18A and trailing edge 18B geometries (or leading edge 18A' and trailing edge 18B' geometries), the configuration of the transition section 18 enables an aerodynamic leading edge creating an updraft in either CW or CCW directions. The transition section 18 also is helpful in respect of differential pressures (top of blade to bottom; front to rear) that can influence dynamic blade pitch angle when moving at different speeds. The channel 18C provides an influence on the blade's angle of attack of the leading cutting edge. The channel 18C may help to improve aerodynamic drag with an influence on the direction of the air flow path closely hugging the surface over the flatter face to reduce or minimize trailing pressure drag as understood with a 'perfect teardrop' strut. Air flow patterns on the top surface of the channel and the underside surface provide a future opportunity for effective pressure differentials that may help stabilize the blade in flight from flapping and resonance. Channel designs can be further improved by developing preferred structures that further prevent flapping or undesirable resonant vibrations with supporting counter torsional forces for a stiffer structure compared to conventional round or teardrop profiles.

On an opposite side of the U-shaped channel 18C, the transition section 18 may be provided with dimples 18D. The dimples 18D may be recessed or raised in varying depths. The dimples 18D may be round, hexagonal, elliptical or any other suitable shape. The dimples 18D are shown symmetrically positioned in a dual straight alignment within the transition section 18 on the top of the blade (or can be placed beyond the transition and into the blade's cutting segment 22, described in more detail below). The dimples 18D also add an inherently more desirable look that alerts a user to an aerodynamic and a more high-tech visual benefit.

Figure 13:
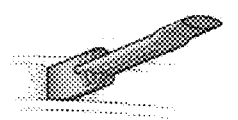
Figure 14:
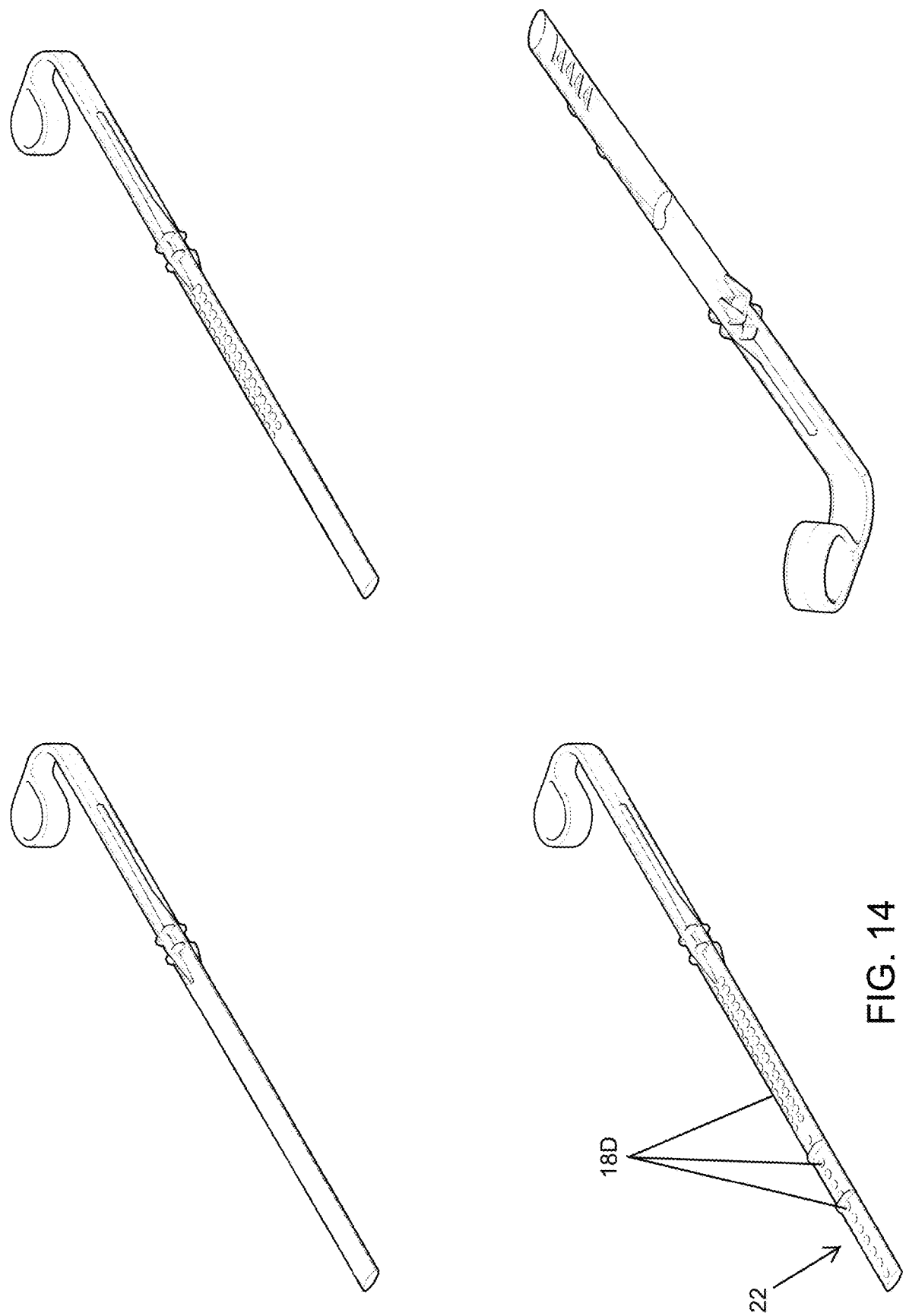

The dimples 18D achieve benefits that will influence blade flight, as well as noise reduction. The blade 10 can also be a designed and produced with deeper continuous grooves (on either or both faces of the upper or lower channel) in place of the symmetrical recessed line of dimples as shown. FIGS. 9-13 show different dimple or groove placements. FIG. 13 shows a raised dimple pattern on the underside of the blade. FIG. 14 shows the dimples 18D extending into the cutting segment 22. Symmetrical rows of dimples on top of the blade in the transition section 18 work to trap air to reduce air-to-surface friction and to assist the air flow profile to wrap or to move closer to the trailing edge to reduce pressure drag. There can be parallel or staggered rows of dimples 18D placed symmetrically on either side of a center line to therefore function in either CW or CCW directions. Also, there can be spacing sequence and alignment, straddling on either side of the central axis to vary in size or spacing in combination with radial velocity variations. The dimples can be applied to the top or bottom of the blade or can work in unison with combined top/bottom sequential patterns that influence reduced drag, directional blade turning forces, and more. These effects will make advancements in new trimmer use and applications such as becoming rotary mowers with updraft that would lift air and grass as being influenced by blade design to use dimple placement as an influence in line blade stability.

The line blade 10 also includes a cutting segment 22 extending from the transition section 18 and having a second cross-sectional shape that is different from the cross-sectional shape of the transition section. With reference to FIGS. 3-5, the cross-sectional shape of the cutting segment 22 may be elliptical. In this context, the leading edge and trailing edge geometries of the cutting segment 22 are sharper than the leading edge 18A and trailing edge 18B geometries of the transition section 18. The elliptical shape of the cutting segment 22 is preferably oriented at a neutral (0°) angle. In some embodiments, an intermediate sharper edge blend could be added between the cutting segment 22 and the transition section 18, blending (blunt to sharper) into the cutting segment 22 (a blended profile to include a gradual blunt to sharp leading into the outer sharp cutting zone).

The channeled transition section 18 with the 10° downward pitch influences turning or twisting the blade to a downward tilt that beneficially helps move upward air and grass upward for better cutting (as with rotary mowing). This was observed when running the same four top dimpled reversible line blades on a CCW rotating Husqvarna 325 gas trimmer and a CW rotating EGO 56 Volt battery trimmer. When running both trimmers at full speeds with the same reversible line blades positioned above paper strips, each with opposite rotations, the paper strips moved toward the running blades to indicate the benefit of updraft due to the intended updraft air from the blades. Each trimmer was also run above dry leaves to observe them rising with the same type upward air draft. This is desirable to assure there is no blow down onto the grass with the reversible blade design that incorporates a 10° leading downward tilt on both sides of the channeled transition section.

Testing for power consumption in Watts has been conducted with (2) dual conventional monofilament lines compared to (4) multi-zone reversible line blade cutters at substantially lower speeds to observe the drop in cutting power (Wattage). The results show significant power reduction benefits when cutting. Similar testing with the subject dimpled reversible line blade shows very good results. Dyno testing (air drag only) of the dimpled reversible line blade shows virtually the same power requirements up through 5500 rpm, and highly improved cutting rates have been demonstrated and observed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A reversible line blade for a rotating trimmer, the reversible line blade comprising:
 a loading section configured to be securable for rotation with a head of the rotating trimmer;
 a living hinge extending from the loading section;
 a transition section extending from the living hinge and having a first cross-sectional shape with matching leading edge and trailing edge geometries; and
 a cutting segment extending from the transition section, the cutting segment having a second cross-sectional shape that is different from the first cross-sectional shape, the cutting segment having matching leading edge and trailing edge geometries, wherein the leading edge and trailing edge geometries of the cutting segment are sharper than the leading edge and trailing edge geometries of the transition section.

2. A reversible line blade according to claim 1, wherein the leading edge and trailing edge geometries of the transition section comprise a blunt or curved surface.

3. A reversible line blade according to claim 2, wherein the first cross-sectional shape is essentially U-shaped, defining a central U-shaped channel along a length of the transition section.

4. A reversible line blade according to claim 3, wherein the U-shaped channel is disposed on a lower surface of the transition section, the transition section further comprising dimples on an upper surface.

5. A reversible line blade according to claim 4, wherein the dimples are recessed or raised.

6. A reversible line blade according to claim 4, wherein the dimples are round, hexagonal or elliptical.

7. A reversible line blade according to claim 4, wherein the dimples extend to or into the cutting segment.

8. A reversible line blade according to claim 1, wherein the first cross-sectional shape is essentially U-shaped, defining a central U-shaped channel along a length of the transition section.

9. A reversible line blade according to claim 1, wherein the first cross-sectional shape is configured to generate an updraft regardless of a rotation direction.

10. A reversible line blade according to claim 9, wherein the leading edge and trailing edge geometries of the transition section comprise a 10 degree downward pitch.

11. A reversible line blade according to claim 1, wherein the second cross-sectional shape is elliptical.

12. A reversible line blade according to claim 1, wherein the leading edge and trailing edge geometries of the transition section comprise a sharp cutting surface.

13. A reversible line blade for a rotating trimmer, the reversible line blade comprising:
a loading section configured to be securable for rotation with a head of the rotating trimmer;
a living hinge extending from the loading section;
a transition section extending from the living hinge and having a first cross-sectional shape, the first cross-sectional shape being essentially U-shaped such that the transition section is curved across a width thereof, wherein the first cross-sectional shape is configured to generate an updraft regardless of a rotation direction; and
a cutting segment extending from the transition section, the cutting segment having a second cross-sectional shape that is different from the first cross-sectional shape, the second cross-sectional shape being configured and oriented for cutting vegetation.

14. A reversible line blade according to claim 13, wherein the first cross-sectional shape is an aerodynamic cross-section with a blunt leading edge and a blunt trailing edge, and wherein the cutting segment second cross-sectional shape comprises a sharper cutting leading edge and a sharper cutting trailing edge.

15. A reversible line blade according to claim 14, wherein the blunt leading edge and the blunt trailing edge comprise matching geometries.

16. A reversible line blade according to claim 15, wherein the blunt leading edge and the blunt trailing edge comprise a 10 degree downward pitch.

17. A reversible line blade according to claim 13, wherein the first cross-sectional shape defines a central U-shaped channel along a length of the transition section.

18. A reversible line blade for a rotating trimmer, the reversible line blade comprising:
a loading section configured to be securable for rotation with a head of the rotating trimmer;
a living hinge extending from the loading section;
a transition section extending from the living hinge and having a first cross-sectional shape, the first cross-sectional shape being essentially U-shaped and configured to generate an updraft regardless of a rotation direction; and
a cutting segment extending from the transition section, the cutting segment having a second cross-sectional shape that is different from the first cross-sectional shape, the second cross-sectional shape being configured and oriented for cutting vegetation,
wherein the first cross-sectional shape defines a central U-shaped channel along a length of the transition section, and wherein the U-shaped channel is disposed on a lower surface of the transition section, the transition section further comprising dimples on an upper surface.

* * * * *